(12) United States Patent
Habuta et al.

(10) Patent No.: US 8,920,896 B2
(45) Date of Patent: Dec. 30, 2014

(54) INFORMATION RECORDING MEDIUM AND MANUFACTURING METHOD OF SAME

(75) Inventors: Haruhiko Habuta, Osaka (JP); Kazuya Hisada, Okayama (JP); Teruhiro Shiono, Osaka (JP); Shigeru Furumiya, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/002,579

(22) PCT Filed: Feb. 6, 2012

(86) PCT No.: PCT/JP2012/000780
§ 371 (c)(1),
(2), (4) Date: Aug. 30, 2013

(87) PCT Pub. No.: WO2012/117671
PCT Pub. Date: Sep. 7, 2012

(65) Prior Publication Data
US 2013/0337217 A1    Dec. 19, 2013

(30) Foreign Application Priority Data
Mar. 3, 2011    (JP) .................................. 2011-046221

(51) Int. Cl.
*G11B 7/24*      (2013.01)
*G11B 7/24035*   (2013.01)
*G11B 7/24085*   (2013.01)
*G11B 7/2433*    (2013.01)
*G11B 7/26*      (2006.01)
*G11B 7/24065*   (2013.01)
*G11B 7/243*     (2013.01)

(52) U.S. Cl.
CPC ........ *G11B 7/24035* (2013.01); *G11B 7/24085* (2013.01); *G11B 7/2433* (2013.01); *G11B 7/26* (2013.01); *G11B 7/24065* (2013.01); *G11B 7/243* (2013.01); *G11B 2007/24306* (2013.01); *G11B 2007/24308* (2013.01); *G11B 2007/24316* (2013.01); *G11B 2007/2432* (2013.01)

USPC .................... 428/64.1; 428/64.4; 430/270.13

(58) Field of Classification Search
CPC . G11B 7/2433; G11B 7/2432; G11B 7/24035
USPC ...................................... 428/64.4; 430/270.13
See application file for complete search history.

(56) References Cited

U.S. PATENT DOCUMENTS

| 5,295,131 A | 3/1994 | Ishibashi et al. |
| 5,591,501 A * | 1/1997 | Ovshinsky et al. ......... 428/64.1 |

(Continued)

FOREIGN PATENT DOCUMENTS

| EP | 2 381 444 | 10/2011 |
| JP | 2584122 | 11/1996 |

(Continued)

OTHER PUBLICATIONS

Stowell, et al., "The growth, structure, melting and solidification of lead deposits on molybdenite and carbon substrates" Proceedings of the Royal Society of London, Series A, vol. 318, pp. 231-241, 1970.

*Primary Examiner* — Elizabeth Mulvaney
(74) *Attorney, Agent, or Firm* — Hamre, Schumann, Mueller & Larson, P.C.

(57) ABSTRACT

An information recording medium (100) of the present invention includes a substrate (1) and a recording layer provided on the substrate (1) and having optical properties that can be changed by irradiation with a laser beam. The recording layer is formed of a plurality of arrayed minute recording regions (e.g., phase-change particles (2)). A part or all of the recording region is made of a recording material containing Te and O. The recording region has a length of 30 nm or less in an information recording direction. Preferably, the recording material further contains an element M, where M is at least one element selected from the group consisting of Pd, Au, and Pt.

8 Claims, 4 Drawing Sheets

(56) References Cited

U.S. PATENT DOCUMENTS

| | | |
|---|---|---|
| 6,649,894 B2 | 11/2003 | Matsumoto et al. |
| 7,245,576 B2 | 7/2007 | Ichihara et al. |
| 8,007,887 B2 * | 8/2011 | Habuta et al. ............ 428/64.1 |
| 8,247,058 B2 | 8/2012 | Habuta et al. |
| 2002/0168548 A1 | 11/2002 | Sakurai et al. |
| 2012/0020199 A1 * | 1/2012 | Hisada et al. ............ 369/275.5 |

FOREIGN PATENT DOCUMENTS

| | | |
|---|---|---|
| JP | 2003-114184 | 4/2003 |
| JP | 2004-227622 | 8/2004 |
| JP | 3793040 | 4/2006 |
| JP | 2010-135020 | 6/2010 |
| JP | 2011-003267 | 1/2011 |
| WO | 2010/032348 | 3/2010 |
| WO | 2010/116707 | 10/2010 |

* cited by examiner

INFORMATION RECORDING MEDIUM AND MANUFACTURING METHOD OF SAME

TECHNICAL FIELD

The present invention relates to information recording media and methods for producing the information recording media, and particularly relates to a high-density information recording medium using near-field light for recording and reproduction, and to a method for producing the information recording medium.

BACKGROUND ART

Optical information recording media as typified by DVDs (Digital Versatile/Video Discs) and Blu-ray Discs are known as information recording media (hereinafter, may be referred to as "recording media" or "media") capable of recording and reproducing large volumes of information. Increase in the recording density of the DVDs and the Blu-ray Discs has been achieved by reducing the spot diameter through shortening of the wavelength of the semiconductor laser used for recording and reproduction and through increase in the numerical apertures (NA) of the objective lens. However, it is considered that, due to the diffraction limit of light, further increase in capacity by reduction in spot diameter is difficult to achieve by hitherto-used methods.

In recent years, an optical recording method using near-field light has been drawing attention as a technique for breaking through the problem of the diffraction limit. When light is incident, for example, on an opening or a particle having a size equal to or smaller than the wavelength of the light, near-field light is generated locally in the immediate vicinity of the opening or the particle. The spot diameter formed by the near-field light does not depend on the wavelength of the incident light, but is determined depending on the size of the opening or the particle on which the light is incident. In early times, a method had been often employed in which light is made incident, for example, on a fiber probe having a sharpened tip, and thus near-field light is generated in minute openings provided in the tip. However, this method has a problem in that the use efficiency of the incident light is low. In recent years, a near-field light generating element using surface plasmon resonance in a metal has been proposed as a device for significantly improving the use efficiency of light (Patent Literature 1, for example). In this device, recording and reproduction are performed by irradiating a minute metal film with light of an appropriate wavelength to induce surface plasmon resonance, and thus by generating near-field light in the vicinity of the metal film. In addition, for example, methods have been proposed in which patterns are formed in advance on a substrate of an information recording medium so that stable recording and reproduction can be performed even when the recording medium has an increased density (Patent Literature 2 and Patent Literature 3, for example).

Furthermore, an information recording medium using nanoparticles for a recording layer has been proposed (Patent Literature 4, for example). The recording layer of this information recording medium is formed of metal particles having a diameter of 100 nm or less and arranged in such a manner as to be enclosed by a phase-change material whose phase state transits to a crystalline state or an amorphous state in response to irradiation with light. In this recording layer, a material exhibiting localized surface plasmon resonance, such as Pt, Ag, Au, Al, or Cu, is used for the metal particles, and a material whose complex dielectric constant changes depending on its phase state, such as Ge—Sb—Te or Ag—In—Sb—Te, is used for the phase-change material. The nanoparticles make it possible to change the complex dielectric constant of the phase-change material by irradiation with light having an intensity equal to or higher than a predetermined level. The degree of localized surface plasmon resonance generated by the nanoparticles changes in accordance with the change of the complex dielectric constant. Such change of the degree of localized surface plasmon resonance allows recording and reproduction of information.

The use of these techniques make it possible to perform recording with reduced-size recording marks. Consequently, further increase in the density and capacity of an optical memory can be achieved.

CITATION LIST

Patent Literature

Patent Literature 1: JP 2003-114184 A
Patent Literature 2: JP Patent No. 2584122
Patent Literature 3: JP Patent No. 3793040
Patent Literature 4: JP 2010-135020 A

SUMMARY OF INVENTION

Technical Problem

In the aforementioned information recording medium using nanoparticles, a core-shell structure is formed by a metal such as Ag, and a chalcogenide such as a Ge—Sb—Te. Accordingly, such an information recording medium has a problem in that the state of the particles changes with time because thermal diffusion occurs at the interface between the metal and the chalcogenide due to, for example, heat generated at the time of reproduction. It is fatal for information recording media to cause deterioration and loss of recorded information during reproduction. Therefore, improvement is needed.

The information recording medium described in Patent Literature 4 is a device proposed to solve a problem in which the amount of feedback light from recording marks decreases with reduction in the size of the recording marks. This device is characterized in that high-intensity scattering light generated by localized surface plasmon resonance is received as feedback light. That is, Patent Literature 4 does not focus any attention on the problem of the change with time of the state of the particles, and does not teach about a method for reducing the change with time of the state of the particles.

The present invention has been made to solve the problems of the above conventional techniques, and aims to provide a large-capacity information recording medium having high reliability.

Solution to Problem

An information recording medium of the present invention includes a substrate and a recording layer provided on the substrate and having optical properties that can be changed by irradiation with a laser beam. The recording layer is formed of a plurality of arrayed minute recording regions. A part or all of the recording region is made of a recording material containing Te and O. The recording region has a length of 30 nm or less in an information recording direction.

A first aspect of the information recording medium production method of the present invention is a method for producing the above-described information recording medium of the present invention, the method including the steps of (I)

preparing a substrate having formed thereon a pattern of recesses and projections, the projections each having a length of 30 nm or less in an information recording direction; and (II) forming on the substrate a film of a recording material containing Te and O or a recording material containing Te, O, and M, where M is at least one element selected from the group consisting of Pd, Au, and Pt, and thereby forming recording regions made of the recording material on the projections.

A second aspect of the information recording medium production method of the present invention is a method for producing the above-described information recording medium of the present invention, the method including the steps of (i) forming on a substrate a film made of a recording material containing Te and O or a recording material containing Te, O, and M, where M is at least one element selected from the group consisting of Pd, Au, and Pt; (ii) placing on the film a mask having patterns each having a length of 30 nm or less in an information recording direction; (iii) etching the film through the mask; and (iv) removing the mask to form a plurality of arrayed recording regions made of the recording material.

Advantageous Effects of Invention

In the information recording medium of the present invention, the recording layer is formed of a plurality of arrayed minute recording regions. Since a part or all of the recording region is made of a recording material containing Te and O, a large-capacity information recording medium having excellent reliability and moisture resistance can be obtained. In addition, with the production method of the present invention, an information recording medium having such excellent properties can be produced.

DESCRIPTION OF EMBODIMENTS

Hereinafter, embodiments of the present invention will be described with reference to the drawings. The following embodiments are described as examples, and the present invention is not limited to the following embodiments. In the following embodiments, the same components or elements are denoted by the same reference numerals, and redundant descriptions are omitted.

Embodiment 1

<Configuration 1 of Information Recording Medium)

Figure 1:
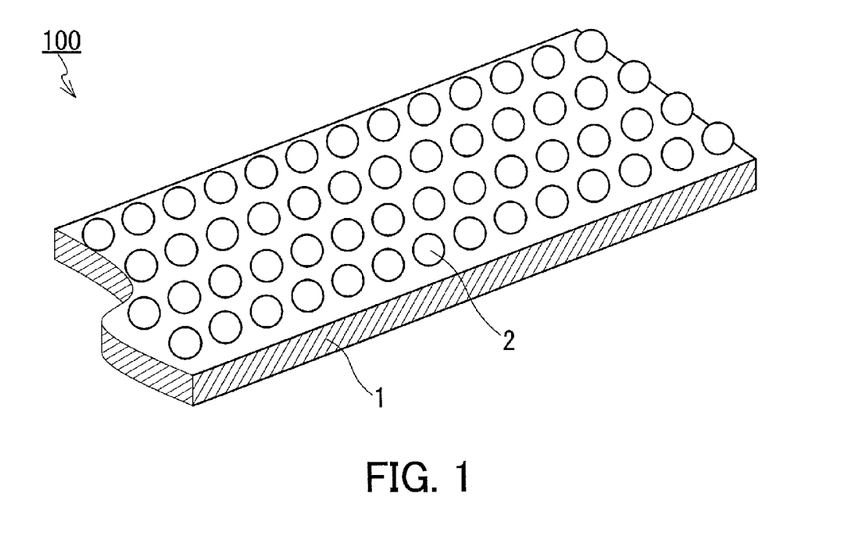
FIG. 1 is a perspective view showing an example of an information recording medium of an embodiment 1 of the present invention.

Hereinafter, an embodiment of the present invention will be described with reference to the drawings. In all of the drawings, a part of an information recording medium is shown in an enlarged view. An example of an information recording medium of the present embodiment is shown in FIG. 1. The information recording medium 100 of the present embodiment includes a substrate 1 and a recording layer provided on the substrate 1. The recording layer is composed of phase-change particles 2 (particles made of a recording material of a phase-change type (phase-change recording material)). The plurality of phase-change particles 2 are arranged on the substrate 1 in such a manner as to be isolated from each other. The substrate 1 has the shape of a disc. The phase-change particles 2 having a length of about 30 nm or less in an information recording direction are arrayed on the substrate 1 so as to be isolated from each other. That is, in the present embodiment, these phase-change particles 2 function as minute recording regions. With this configuration, each phase-change particle 2, i.e., each minute recording region, can be locally heated. Accordingly, a stable recording layer free of thermal diffusion can be obtained, and high-density recording can be performed using the minute recording region (phase-change particle 2) as a minimum unit. Therefore, the information recording medium 100 that allows stable recording on each phase-change particle 2 and that has an increased density can be fabricated. Preferably, the phase-change particles 2 are regularly arrayed. Here, the information recording direction means a tracking direction along which information is recorded on the information recording medium 100.

In the present embodiment, the substrate 1 is formed of glass. In the present embodiment, glass is selected with a focus on flatness. However, a metal such as aluminum, or a plastic material such as polycarbonate, may be used. Preferably, the substrate 1 has a high flatness, and is highly stable when the information recording medium is rotated for recording or reproduction.

A recording material of a phase-change type containing Te and O, or a recording material of a phase-change type containing Te, O, and M, is used for the phase-change particles 2. Hereinafter, a material containing Te and O may be referred to as "Te—O", a material containing Te, O, and M may be referred to as "Te—O-M", and a material containing Te and M may be referred to as "Te-M". The Te—O serving as a phase-change recording material is a composite material in the case of which particles of Te are uniformly distributed in $TeO_2$ immediately after film formation. In addition, the Te—O-M serving as a phase-change recording material is a composite material in the case of which particles of Te, Te-M, and M are uniformly distributed in $TeO_2$ immediately after film formation. The crystal grain sizes of Te and Te-M are increased by irradiation with a laser beam, and the difference in optical state at this time can be detected in the form of a signal. Although Te is susceptible to degradation by moisture, the $TeO_2$ layer performs the function of moisture prevention. The $TeO_2$ layer further performs the function of preventing the growth of the crystal nucleus of Te at room temperature and thus maintaining stability. Accordingly, the Te—O and the Te—O-M have high environmental reliability. The present inventors have found that the above functions of the Te—O or the Te—O-M can be effectively exerted even when, as in the present embodiment, the Te—O or the Te—O-M is used for very minute recording regions having a length of 30 nm or less in the information recording direction.

The element M is added in order to facilitate crystallization of Te, and this effect can be obtained as long as the element M is an element capable of forming a bond with Te, such as Au, Pd, and Pt. Elements such as Au, Pd, and Pt, are particularly preferred elements because they are noble metals, less likely to bond to oxygen, and thus more likely to bond to Te. Accordingly, the element M in the Te—O-M can be at least one element selected from the group consisting of Pd, Au, and Pt.

The phase-change particles 2 can be formed, for example, of a material containing Te—O—Pd (e.g., Te:O:Pd=60:21:19 [at %]). Alternatively, the phase-change particles 2 can also be formed using a material containing any of Te—O, Te—O—Au, and Te—O—Pt. A material that allows high crystallization rate of the phase-change particles 2 is preferable in order to increase the writing speed of the information recording medium 100. Particularly, in order to increase the crystallization rate, Pd, Au, and/or Pt, which are noble metals, are preferably contained in the Te—O. The content of Pd in a Te—O—Pd phase-change recording material is preferably 30% or more, the content of Au in a Te—O—Au phase-change recording material is preferably 30% or more, and the content of Pt in a Te—O—Pt phase-change recording material is preferably 30% or more.

As described above, the information recording medium 100 of the present embodiment 1 is an information recording medium at least including the substrate 1 and the recording layer having optical properties that are changed by irradiation with a laser beam. The recording layer is composed of particles (phase-change particles 2) arrayed regularly. A part or all of the particle is made of a material containing Te and O. The size of the particle only needs to be such that the length in the information recording direction is 30 nm or less. In order to further ensure that stable high-density recording is achieved, for example, the longitudinal diameter may be adjusted to 30 nm or less. By thus using the particles containing Te and O, a high-density information recording medium having an improved reliability can be obtained.

Furthermore, in the information recording medium 100 of the present embodiment 1, a part or all of the phase-change particle 2 may be made of a material containing Te, O, and M, where M is at least one element selected from the group consisting of Pd, Au, and Pt. By thus adding M along with Te and O, information can be recorded at an increased speed, and change with time of signal marks can be reduced.

The recording material used for the phase-change particles 2 preferably has such a composition that the value of $n^2-k^2$ is negative when the complex refractive index of the recording material at the wavelength of the laser beam used for recording and reproduction is represented as $n-ik$. When the value of $n^2-k^2$ is positive, the state of electrons exhibits a behavior similar to those in dielectric materials, and localized surface plasmon resonance might be less likely to occur. On the other hand, when the value of $n^2-k^2$ is negative, the state of electrons exhibits a behavior similar to those in metals, and localized surface plasmon resonance is more likely to occur. Accordingly, selecting a composition in which the value of $n^2-k^2$ is negative allows further reduction in spot diameter and therefore further increase in surface density. In addition, recording sensitivity can also be improved.

In Table 1, the complex refractive indices of thin films of Te—O—Pd phase-change recording materials are compared. There is a general tendency that the value of $n^2-k^2$ is negative in a composition range where the content of O is low, although the composition range cannot be definitely specified since the complex refractive index depends also on the contents of Te and Pd. Accordingly, a material having a Te—O—Pd composition in which the content of O is lower can be said to be more suitable as a material of the phase-change particles 2 of the information recording medium 100. The same tendency is shown by Te—O—Au phase-change recording materials and Te—O—Pt phase-change recording materials. The complex refractive indices listed in Table 1 are those determined by calculation.

TABLE 1

| Sample No. | Composition analysis (at %) | | | Complex refractive index | | | | | | | | |
|---|---|---|---|---|---|---|---|---|---|---|---|---|
| | | | | 405 nm | | | 660 nm | | | 780 nm | | |
| | Te | O | Pd | n | k | $n^2-k^2$ | n | k | $n^2-k^2$ | n | k | $n^2-k^2$ |
| 1 | 100 | 0 | 0 | 1.92 | 3.09 | −5.86 | 5.08 | 3.12 | 16.07 | 5.25 | 2.09 | 23.19 |
| 2 | 80 | 0 | 20 | 1.09 | 2.67 | −5.94 | 2.06 | 4.43 | −15.38 | 2.57 | 5.00 | −18.40 |
| 3 | 50 | 0 | 50 | 1.68 | 1.93 | −0.90 | 2.22 | 3.44 | −6.91 | 2.64 | 3.85 | −7.85 |
| 4 | 20 | 0 | 80 | 1.52 | 2.73 | −5.14 | 2.52 | 4.05 | −10.05 | 2.95 | 4.50 | −11.55 |
| 5 | 45 | 4 | 51 | 1.77 | 1.92 | −0.55 | 2.34 | 3.35 | −5.75 | 2.80 | 3.76 | −6.30 |
| 6 | 93 | 7 | 0 | 2.00 | 3.00 | −5.00 | 4.82 | 3.07 | 13.81 | 5.23 | 2.23 | 22.38 |
| 7 | 13 | 7 | 80 | 1.92 | 2.60 | −3.07 | 2.47 | 3.83 | −8.57 | 2.82 | 4.27 | −10.28 |
| 8 | 40 | 13 | 47 | 1.90 | 1.73 | 0.62 | 2.31 | 2.87 | −2.90 | 2.68 | 3.29 | −3.64 |
| 9 | 85 | 15 | 0 | 2.31 | 2.03 | 1.22 | 3.78 | 1.51 | 12.01 | 3.93 | 1.17 | 14.08 |
| 10 | 38 | 20 | 43 | 2.04 | 1.49 | 1.94 | 2.54 | 2.07 | 2.17 | 2.75 | 2.28 | 2.36 |
| 11 | 60 | 21 | 19 | 1.70 | 1.82 | −0.42 | 2.34 | 2.56 | −1.08 | 2.59 | 2.82 | −1.24 |
| 12 | 12 | 21 | 67 | 2.02 | 2.23 | −0.89 | 2.85 | 2.93 | −0.46 | 3.09 | 3.16 | −0.44 |
| 13 | 11 | 29 | 60 | 2.20 | 1.99 | 0.88 | 2.90 | 2.40 | 2.65 | 3.19 | 2.53 | 3.78 |
| 14 | 51 | 34 | 15 | 1.92 | 1.60 | 1.13 | 2.61 | 2.04 | 2.65 | 2.89 | 2.16 | 3.69 |

Furthermore, a protective layer may be provided at an upper portion or a lower portion of the phase-change particle 2, or may be provided so as to enclose the phase-change particle 2. That is, the phase-change particle 2 may be sandwiched between protective layers, or may be covered with a protective layer. In still other words, the information recording medium 100 may further include a protective layer disposed between the phase-change particle 2 and the substrate 1, a protective layer disposed on the phase-change particle 2 (on the portion of the phase-change particle 2 opposite from the substrate 1 side), or a protective layer covering the surface of the phase-change particle 2. In this case, it is possible to obtain the effect of improving the environmental reliability and reproduction durability or the effect of increasing the recording speed. That is, change with time of signal marks can be reduced, and moisture resistance can be improved.

Examples of materials that can be used for the protective layer include: sulfides such as ZnS; selenides such as ZnSe; oxides such as $SiO_2$, $Al_2O_3$, $TiO_2$, $Ta_2O_5$, $ZrO_2$, $Cr_2O_3$, $Nb_2O_5$, $Bi_2O_3$, $HfO_2$, ZnO, $Nb_2O_5$, $SnO_2$, $Ga_2O_3$, $In_2O_3$, $Y_2O_3$, MgO, $TeO_2$, and $Bi_4Ti_3O_{12}$; nitrides such as Ge—N, $Si_3N_4$, and AlN; oxynitrides such as Ge—O—N, Cr—O—N, Si—O—N, Al—O—N, Nb—O—N, Mo—O—N, Ti—O—N, Zr—O—N, and Ta—O—N; carbonates such as SiC; and fluorides such as $AlF_3$, $CaF_2$, and $LaF_3$. The protective layer can be formed using one of the above materials or a mixture of two or more of the above materials (e.g., ZnS—$SiO_2$).

The thickness of the protective layer is preferably 10 nm or less. When the thickness of the protective layer is 10 nm or more, near-field light described later is less likely to be focused on the phase-change particles 2, which might lead to unstable recording. Furthermore, when the thickness of the protective layer is set to 5 nm or less, more stable recording can be performed.

Figure 2:
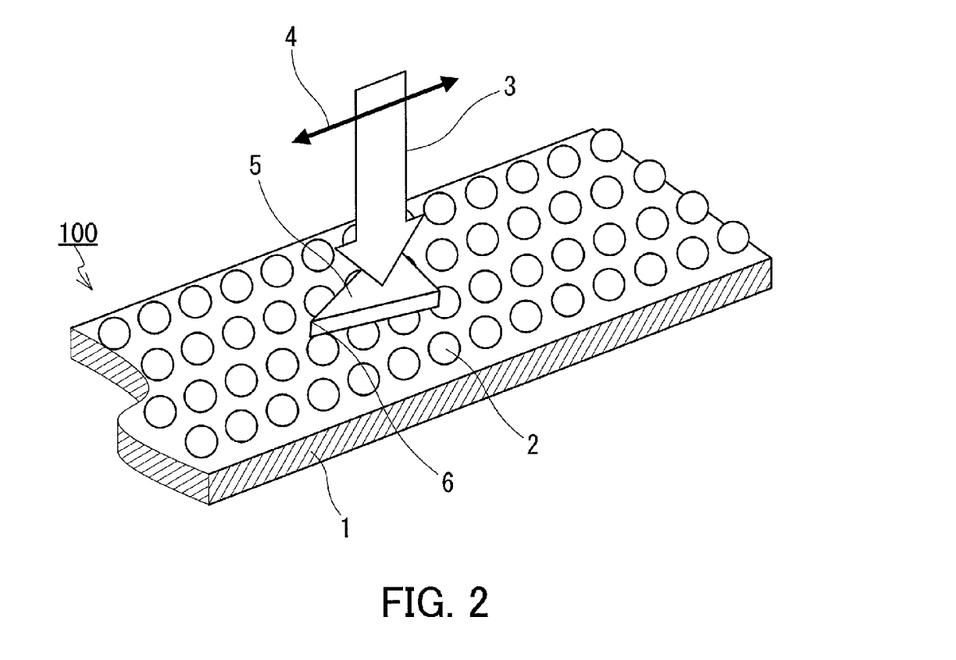
FIG. 2 is a perspective view showing an example of a method for recording and reproduction on the information recording medium of the embodiment 1 of the present invention.

FIG. 2 shows an example of a method for recording and reproduction on the information recording medium 100 of the present embodiment. By irradiating a metal member referred to as an antenna 5 with light 3 polarized in a polarization direction 4 shown in FIG. 2, intense near-field light can be generated at an apex 6 of the antenna 5 in the polarization direction 4 by plasmon enhancement. The enhanced near-field light increases the temperature of the phase-change particle 2, and information is recorded on the phase-change particle 2. The recording of information on the phase-change particle 2 is performed by a process in which the phase-change particle 2 is made amorphous by being heated to the melting point or higher and then being rapidly cooled or by a process in which the phase-change particle 2 is crystallized by being heated to the melting point or higher and then being gradually cooled. The recording of information utilizes the fact that the phase-change particle 2 has different optical properties depending on whether the particle 2 is in an amorphous state or in a crystalline state.

For example, Au can be used as a material of the antenna 5. It is preferable that a material in which plasmon resonance is more likely to occur be selected from noble metal materials such as Au, Ag, Al, Cu, Pt, and Pd, depending on the wavelength of the laser beam used.

Figure 3:
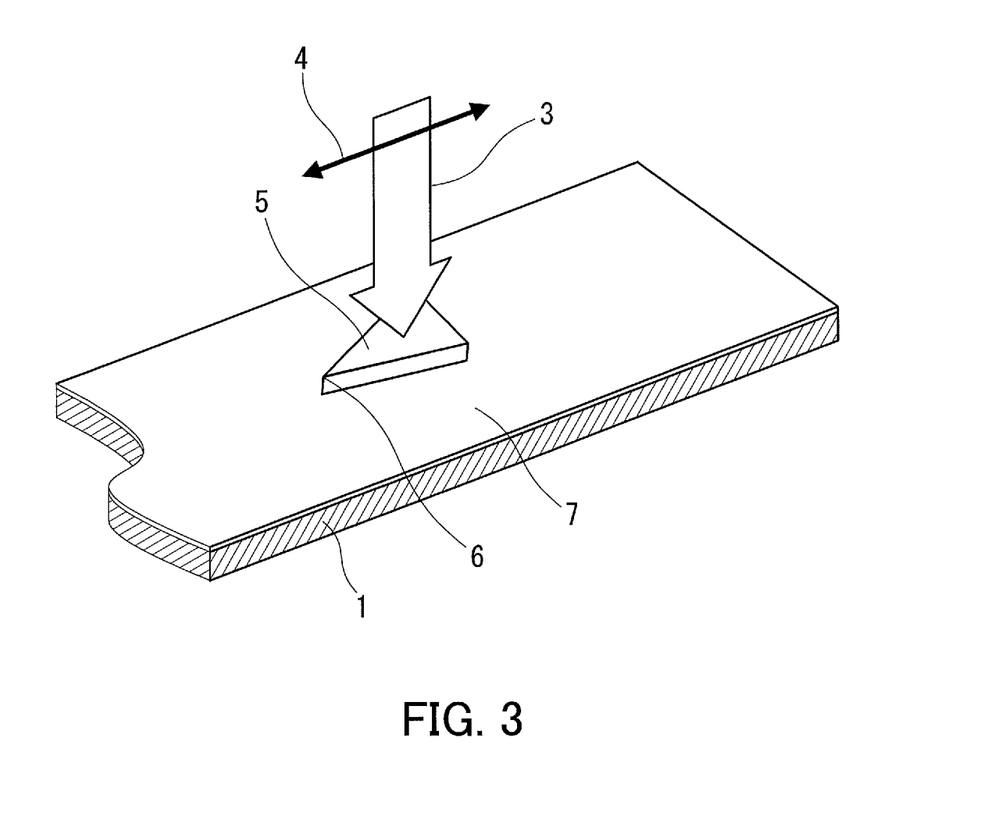
FIG. 3 is a perspective view showing an example of a method for recording and reproduction on a conventional information recording medium including a recording layer formed of a continuous phase-change film.

Here, a comparison is made between recording on the phase-change particles 2 of FIG. 2 which are arrayed so as to be isolated from each other and recording on an undivided, continuous phase-change thin film 7 of FIG. 3. In the case of the phase-change particles 2, good recording was achieved using the size of each phase-change particle 2 as a minimum unit. However, in the case of the continuous phase-change thin film 7 as shown in FIG. 3, when the phase-change thin film 7 was heated by near-field light to crystallize the phase-change thin film 7, heat disadvantageously diffused through the phase-change thin film 7. As a result, only large recording marks of 30 nm or more was made even when the spot diameter of the near-field light was 30 nm or less. It is when the size of the recording mark is to be limited to 30 nm or less that such heat diffusion makes a difference in the size of the recording mark between the phase-change particle 2 and the continuous phase-change thin film 7. Therefore, in the case where information is recorded on minute recording regions having a length of 30 nm or less in the information recording direction, the phase-change particles 2 isolated from each other and having a length of 30 nm or less in the information recording direction are preferably used.

It is known that when the phase-change particles 2 are formed to have a length of 30 nm or less in the information recording direction (preferably, the longitudinal diameter is 30 nm or less), the melting point of the recording material used for the phase-change particles 2 is decreased (reference: Proc. Roy. Soc. Lond. A., 318 231). Therefore, forming a recording layer by such particles can reduce recording energy.

The length of each of the phase-change particles 2 in the information recording direction is preferably 20 nm or less, and the longitudinal diameter is preferably 20 nm or less. In this case, the phase-change particles 2 tend to have smooth surfaces, and thus near-field light is more likely to be focused on the phase-change particles 2 when information is recorded using near-field light. Therefore, the recording can easily be performed. In addition, the length of each phase-change particle 2 in the information recording direction is preferably as short as feasible. This is because the shorter the length is (e.g., the smaller the particle diameter of the phase-change particle 2 is), the larger the recording capacity per unit area is.

However, the phase-change particles 2 having a reduced length of about 3 nm (e.g., a particle diameter of about 3 nm) are not preferable. This is because, in this case, the number of atoms contained in the particles is small, and the degree of contrast is reduced. In addition, since the melting point of the phase-change particles 2 is lowered, the state of the phase-change particles 2 might be changed by reproduction light or the like, which makes it difficult to maintain the state of the recorded information. In view of the above, the length of each phase-change particle 2 in the information recording direction is preferably 3 nm or more (the longitudinal diameter of each phase-change particle 2 is 3 nm or more, for example).

The information recording medium of the present embodiment may be, for example, an information recording medium at least including a substrate and a recording layer having optical properties that are changed by irradiation with a laser beam, the recording layer being composed of particles arrayed regularly, a part or all of the particle being made of a material containing Te and O, the particle having a longitudinal diameter of 30 nm or less. Alternatively, the information recording medium of the present embodiment may be, for example, an information recording medium at least including a substrate and a recording layer having optical properties that are changed by irradiation with a laser beam, the recording layer being composed of particles arrayed regularly, a part or all of the particle being made of a material containing Te, O, and M, where M is at least one element selected from the group consisting of Pd, Au, and Pt, the particle having a longitudinal diameter of 30 nm or less.

The information recording medium 100 of the present embodiment can be produced by arraying the phase-change particles 2 on the substrate 1. The method for forming the phase-change particles 2 arrayed on the substrate 1 is not particularly limited. For example, the phase-change particles 2 can be arrayed on the substrate 1 by a method in which a film made of a phase-change recording material is formed on the substrate 1, a mask is provided on the film using an electron beam, and the film is etched into the phase-change particles 2 isolated from each other, or by a method in which the phase-change particles 2 are arrayed in a self-organizing manner. More specific examples of the production method will be given in embodiments described later.

One embodiment of the present invention has been described above with reference to an example. However, the present invention is not limited to the above embodiment, and can be applied to other embodiments based on the technical concept of the present invention.

Embodiment 2

<Configuration 2 of Information Recording Medium>

Hereinafter, an example of another embodiment of the information recording medium of the present invention will be described with reference to the drawings. Redundant descriptions of the same components as those described in the embodiment 1 are omitted.

Figure 4A:
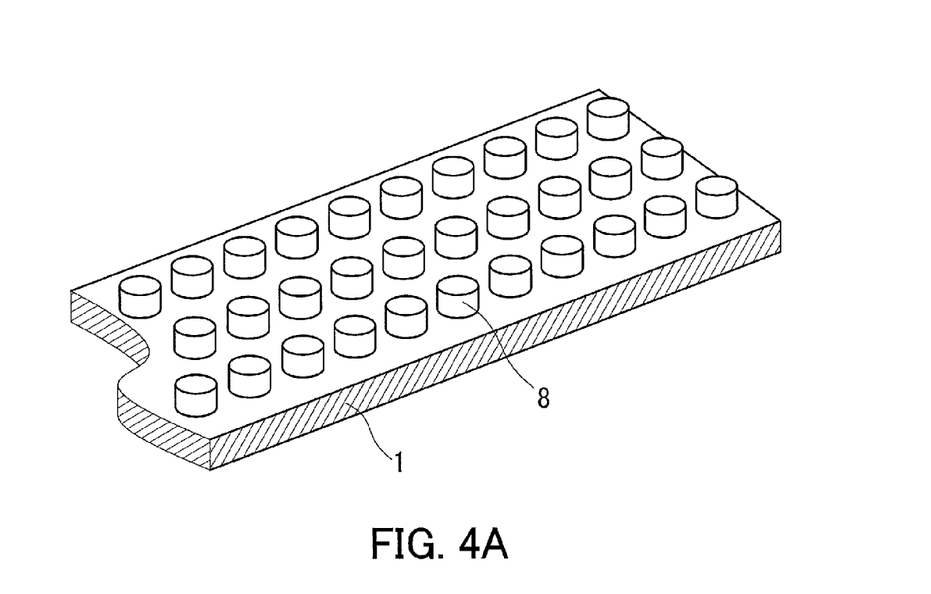
FIG. 4A is a perspective view showing an example of a substrate in an information recording medium of an embodiment 2 of the present invention, the substrate having a surface on which cylindrical pillars are formed.
Figure 4B:
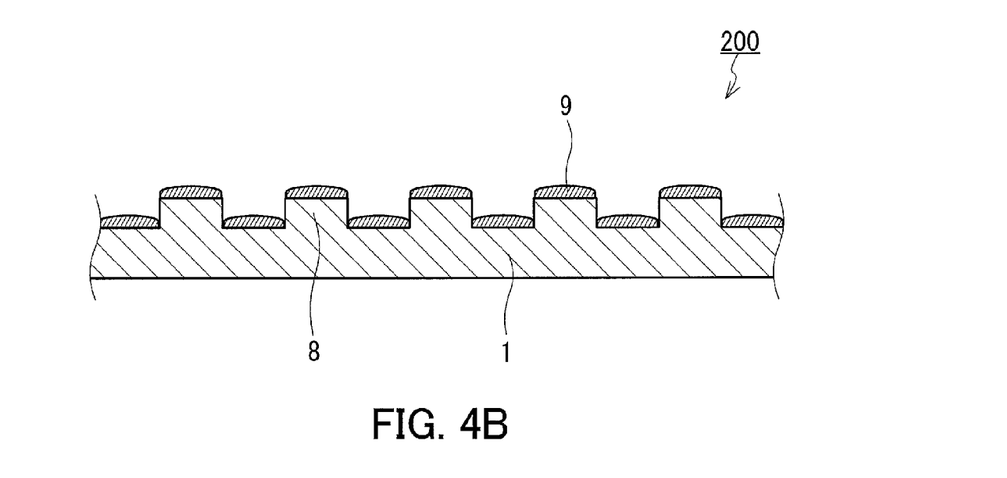
FIG. 4B is a cross-sectional view showing an example of the information recording medium of the embodiment 2 of the present invention.

In the embodiment 1, the recording regions are formed by arraying the phase-change particles 2 on the substrate 1 in such a manner that the phase-change particles 2 are isolated from each other. In the present embodiment, a description is given of an example of an information recording medium in which minute recording regions are arrayed, the recording regions being formed, as shown in FIG. 4A, by previously forming on the substrate 1 a plurality of pillars 8 that are isolated from each other and that have a length of 30 nm or less in the information recording direction, and then by forming films made of a phase-change recording material on the pillars 8 (on the top surfaces of the pillars 8). That is, in the information recording medium 200 of the present embodiment, as shown in FIG. 4B, the plurality of pillars 8 isolated from each other and having a length of 30 nm or less in the information recording direction are arrayed on the substrate 1, and the recording regions are formed as film portions 9 made of a recording material and provided on the pillars 8. The portions functioning as the recording regions in the configuration of the information recording medium 200 of the present embodiment are those portions (film portions 9) of the film of the recording material which are provided on the pillars 8, and the remaining portions (e.g., film portions formed on other regions of the substrate 1 than the pillars 8) do not correspond to the recording regions of the present invention. The recording material used in the present embodiment is the same as the recording material described in the embodiment 1.

The shape of the pillars 8 is not limited to a cylindrical shape shown in FIG. 4A, and may be the shape of, for example, a triangular prism, a rectangular prism, a sphere, or an inverted triangular pyramid.

The information recording medium 200 of the present embodiment can also achieve the same effect as the information recording medium 100 of the embodiment 1. For example, when the recording properties of the information recording medium 200 were compared with the recording properties of the information recording medium 100 of the embodiment 1 fabricated using the same recording material, the obtained result showed that their recording properties were almost equivalent.

Embodiment 3

<Method 1 for Producing Information Recording Medium>

An embodiment of the present invention will be described below with reference to FIG. 4A and FIG. 4B. Here, an example of an embodiment of a method for producing an information recording medium will be described. The production method of the present embodiment is an example of a method for producing the information recording medium 200 of the embodiment 2. Redundant descriptions of the same components as those described in the embodiments 1 and 2 are omitted.

The production method of the present embodiment includes the steps of:

(I) preparing a substrate 1 having formed thereon a pattern of recesses and projections (a plurality of arrayed pillars 8), the projections (pillars 8) each having a length of 30 nm or less in the information recording direction; and (II) forming on the substrate 1 a film of a recording material containing Te and O or a recording material containing Te, O, and M, where M is at least one element selected from the group consisting of Pd, Au, and Pt, and thereby forming recording regions made of the recording material on the projections.

As shown in FIG. 4A, the cylindrical pillars 8 are formed on the substrate 1. The size of the pillars 8 is such that, for example, the width is about 20 nm, and the height is about 20 nm. Each of the pillars 8 is desirably formed in an isolated manner so as to avoid contact between the pillars 8 adjacent to each other. A film of a phase-change recording material is formed on the substrate 1 on which such pillars 8 have been formed. In this manner, the film of the phase-change recording material as shown in FIG. 4B can be formed on the substrate 1. The film portions 9 of the film that are formed on the pillars 8 serve as minute recording regions. With the method as described above, minute recording regions isolated from each other can be arrayed on the substrate 1. The pillars 8 are formed, for example, by etching the substrate 1 based on patterns made by electron lithography. The pillars 8 can also be prepared by other methods. When the recording properties of the information recording medium 200 fabricated by the method as described above were compared with the recording properties of the information recording medium 100 of the embodiment 1 fabricated using the same recording material, it was found that their recording properties were almost equivalent.

The shape of the projections (the shape of the pillars 8) formed on the substrate 1 is not limited to a cylindrical shape as shown in FIG. 4A, and may be the shape of a triangular prism, a rectangular prism, a sphere, or an inverted triangular pyramid. The phase-change recording material portions formed as films on the projections, i.e., on the top surfaces of the pillars 8, are preferably isolated from each other. In view of increasing the recording density, it is preferable that the phase-change recording material portions be as minute as possible, be isolated from each other, and be as close as possible to each other. In addition, preferably, a film of a phase-change recording material is not formed on the side surface of each projection (pillar 8) so that the film portions 9 functioning as the recording regions are isolated from each other.

In the information recording medium 200, the minute recording regions constituting the recording layer are embodied as the film portions 9 made of a recording material. Accordingly, as in the production method of the present embodiment, isolated recording regions based on patterns can be arrayed in the information recording medium 200 using a thin film formation method widely used in industry, such as sputtering and vapor deposition.

That is, the method of the present embodiment for producing an information recording medium can be regarded also as a method that includes forming a recording layer in the form of a film on a substrate having formed thereon a pattern of recesses and projections each having a size of 30 nm or less, and thereby forming particles having a size of 30 nm or less, arrayed regularly, and made of Te and O or of Te, O, and M, where M is at least one element selected from the group consisting of Pd, Au, and Pt.

One embodiment of the present invention has been described above with reference to an example. However, the present invention is not limited to the above embodiment, and can be applied to other embodiments based on the technical concept of the present invention.

Embodiment 4

<Method 2 for Producing Information Recording Medium>

An embodiment of the present invention will be described below with reference to FIG. 5 and FIG. 6. Here, an example of an embodiment different from the embodiment 3 will be described for the method for producing an information recording medium. The production method of the present embodiment is an example of a method for producing the information recording medium 100 of the embodiment 1. Redundant descriptions of the same components as those described in the embodiments 1 and 2 are omitted. In the present embodiment, a description is given of an example in which the phase-change particles 2 are formed and arrayed as patterns formed of a recording material on the substrate 1. That is, as shown in FIG. 6, in an information recording medium 300 produced by the production method of the present embodiment, the phase-change particles 2 having a length of 30 nm or less in the information recording direction are formed as patterns 12 formed of a recording material on the substrate 1. The recording material used in the present embodiment is the same as the recording material described in the embodiment 1.

Figure 5:
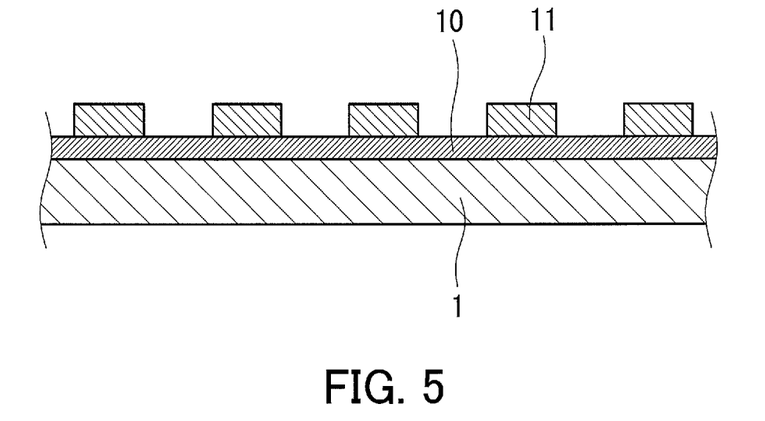
FIG. 5 is a cross-sectional view showing a state where mask having predetermined patterns has been formed on a film made of a recording material in an example of an information recording medium production method of an embodiment 4 of the present invention.
Figure 6:
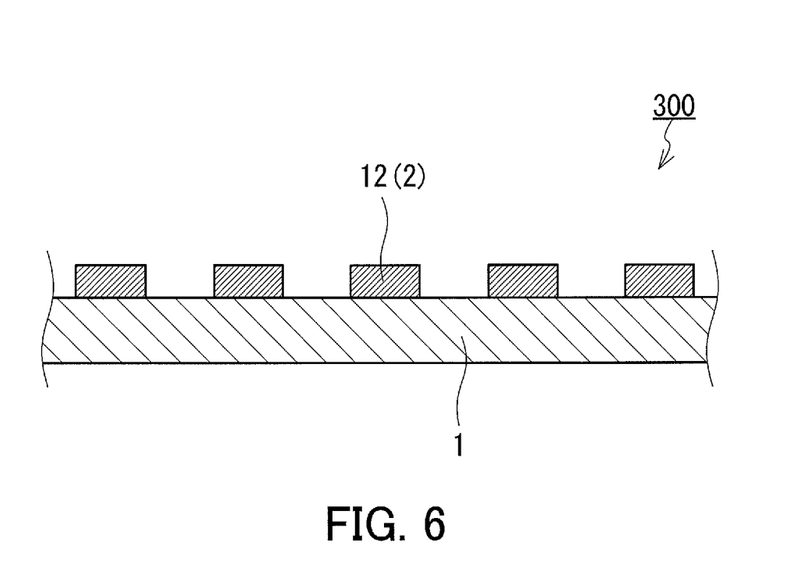
FIG. 6 is a cross-sectional view showing a state where minute recording regions isolated from each other have been formed on a substrate in an example of the information recording medium production method of the embodiment 4 of the present invention.

The production method of the present embodiment includes the steps of:

(i) forming on the substrate 1 a film 10 made of a recording material containing Te and O or a recording material containing Te, O, and M, where M is at least one element selected from the group consisting of Pd, Au, and Pt (see FIG. 5);

(ii) placing on the film 10 a mask having patterns 11 each having a length of 30 nm or less in the information recording direction (see FIG. 5);

(iii) etching the film 10 through the mask; and (iv) removing the mask to form a plurality of arrayed recording regions (phase-change particles 2) made of the recording material.

An example of the production method of the present embodiment will be described with reference to FIG. 5 and FIG. 6. As shown in FIG. 5, first, the film 10 made of a recording material is formed uniformly on the flat substrate 1, and then a mask having desired patterns 11 is placed on the film 10. For example, the mask having the patterns 11 can be placed on the film 10 as follows: a film of a material of the mask is formed uniformly on the film 10; patterns are written on the film with an electron beam; and the film is developed. Thereafter, the film 10 is etched based on the patterns 11 of the mask. Examples of the material that can be used for the mask include: inorganic materials such as oxides of Te, ZnS, and oxides of transition metals; and organic resists (e.g., ZEP 520 of ZEON CORPORATION) commonly used for an electron beam. The material of the mask is preferably selected as appropriate in view of the etching rate ratio between the material and the recording material of the film 10.

After the mask is placed, the film 10 is etched, and then the mask is removed, with the result that desired patterns 12 made of the recording material are formed as shown in FIG. 6. By forming these patterns 12, the medium 300 in which a plurality of phase-change particles 2 isolated from each other are arrayed can be fabricated. In the present embodiment, the mask is formed by forming patterns with electron beam lithography and then performing etching. However, not only this method, but also another commonly-known method for mask fabrication can be used. The etching of the film 10 made of the recording material can be performed using an Ar gas or an $O_2$ gas. The etching may be performed using another type of gas.

In the information recording medium 300 produced by the production method of the present embodiment, the phase-change particles 2 functioning as minute recording regions isolated from each other are embodied as the patterns 12 made of the recording material. Accordingly, isolated recording regions based on the patterns can be arrayed using a thin film formation method widely used in industry, such as sputtering and vapor deposition.

In other words, the method of the present embodiment for producing an information recording medium can be regarded also as a method that includes: forming a recording layer in the form of a film on a substrate; forming on the recording layer a mask having patterns each having a size of 30 nm or less; and etching the recording layer through the mask, and thereby forming particles having a size of 30 nm or less, arrayed regularly, and made of a phase-change recording material.

One embodiment of the present invention has been described above with reference to an example. However, the present invention is not limited to the above embodiment, and can be applied to other embodiments based on the technical concept of the present invention.

INDUSTRIAL APPLICABILITY

The information recording medium and the production method thereof according to the present invention are useful for increasing the recording density of an information recording medium in which a phase-change recording material is used, and are useful for increasing the environmental reliability of the recording marks.

The invention claimed is:

1. An information recording medium comprising:
   a substrate; and
   a recording layer formed on the substrate and having optical properties that are changed by irradiation with a laser beam,
   wherein the recording layer is formed of a plurality of arrayed minute recording regions,
   a part or all of the recording region is made of a recording material comprising Te and O,
   the recording region has a length of 30 nm or less in an information recording direction, and
   when a complex refractive index of the recording material at a wavelength of a laser beam used for recording or reproduction is represented as n–ik, a value of $n^2-k^2$ is a negative value.

2. The information recording medium according to claim 1, wherein the recording material further comprises an element M, where M is at least one element selected from the group consisting of Pd, Au, and Pt.

3. The information recording medium according to claim 1, wherein the plurality of recording regions are isolated from each other.

4. The information recording medium according to claim 1, further comprising a protective layer formed at least either between the recording region and the substrate or on the recording region, or further comprising a protective layer covering a surface of the recording region.

5. The information recording medium according to claim 1, the recording regions are particles.

6. The information recording medium according to claim 1, further comprising a plurality of pillars arrayed on the substrate, the pillars being isolated from each other and each having a length of 30 nm or less in the information recording direction, wherein the recording regions are films made of the recording material and formed on the pillars.

7. A method for producing the information recording medium according to claim 1, comprising steps of:
(I) forming a pattern of recesses and projections on the substrate, the projections each having a length of 30 nm or less in the information recording direction; and
(II) forming on the substrate a film of the recording material comprising Te and O or the recording material comprising Te, O, and M, where M is at least one element selected from the group consisting of Pd, Au, and Pt, and thereby forming the recording regions made of the recording material on the projections.

8. A method for producing the information recording medium according to claim 1, comprising steps of:
(i) forming on the substrate a film made of the recording material comprising Te and O or the recording material comprising Te, O, and M, where M is at least one element selected from the group consisting of Pd, Au, and Pt;
(ii) placing on the film a mask having patterns each having a length of 30 nm or less in the information recording direction;
(iii) etching the film through the mask; and
(iv) removing the mask so as to form a plurality of the recording regions made of the recording material and arrayed.

* * * * *